United States Patent
Schofield

[15] 3,704,915
[45] Dec. 5, 1972

[54] METHOD AND APPARATUS FOR ANCHORING BRISTLE BUNDLES IN A BRUSH BLOCK

[72] Inventor: Arthur T. Schofield, Becksville, Ohio

[73] Assignee: The Manufacturers Brush Company, Guyahoga County, Ohio

[22] Filed: March 4, 1971

[21] Appl. No.: 121,061

[52] U.S. Cl. ..........................300/21, 300/8, 300/11
[51] Int. Cl. ..............................................A46d 3/04
[58] Field of Search............300/3, 4, 5, 8, 10, 11, 21; 408/3; 227/90

[56] References Cited

UNITED STATES PATENTS

| | | | |
|---|---|---|---|
| 3,092,159 | 6/1963 | Ebser | 408/3 |
| 3,187,972 | 6/1965 | Shann | 227/90 |
| 3,532,893 | 10/1970 | Marantette et al. | 408/3 X |

*Primary Examiner*—Granville Y. Custer, Jr.
*Attorney*—McCoy, Greene and Howell

[57] ABSTRACT

A method and apparatus for locating and indexing brush blocks relative to an operating head, the blocks having a plurality of holes formed therein for anchoring bristle bundles or tufts. Each block is moved intermittently at spaced time intervals to locate each hole therein sequentially in a predetermined position in spatial registration with an operating head and bristle bundle to be anchored. The holder for the brush block or blocks is capable of compound or three dimensional movement to accommodate a plurality of locations within a space defined by three dimensional spatial limits along three mutually perpendicular axes. This serves to accommodate brush blocks having curved bristle anchoring faces. The movement of the holder along the three mutually perpendicular axes is controlled by three pulse motors and by means for generating sequential groups of predetermined numbers of driving pulses for operating the motors intermittently at spaced time intervals so as to move the holder between anchoring operations through a predetermined two or three dimensional plot corresponding to the hole locations.

8 Claims, 13 Drawing Figures

PATENTED DEC 5 1972

INVENTOR.
ARTHUR T. SCHOFIELD
BY
McCoy, Greene & Howell
ATTORNEYS

INVENTOR.
ARTHUR T. SCHOFIELD
BY
McCoy, Greene & Howell
ATTORNEYS

METHOD AND APPARATUS FOR ANCHORING BRISTLE BUNDLES IN A BRUSH BLOCK

BACKGROUND OF THE DISCLOSURE

This invention relates to machines for making brushes and the like and especially to machines for automatically anchoring bristle bundles to form tufts in brush blocks such as in the case of wire tufted hand brushes, floor brushes, etc. More particularly the invention relates to a method and apparatus for sequentially locating and indexing one or more brush blocks through a predetermined two or three dimensional plot so that the various tuft anchoring locations on the block or blocks are progressively placed in spatial registration with an operating head that anchors the tufts to the respective block. The operating head may be, for example, of the type shown in U.S. Pat. No. 1,512,588. Machines of the type shown in this patent are known in the brush making art as "drill and fill" machines.

Prior art "drill and fill" machines have utilized reciprocating operating heads, one of which serves to drill a number of holes in a predetermined pattern in a brush block and the other of which simultaneously fills the drilled holes in another block. The "filling" operation includes the steps of (1) "picking off" a bristle bundle, (2) positioning a staple at the central portion of the bundle, (3) bending or "breaking" the bundle at its mid-point and (4) driving the staple and "broken" portion or bight of the bristle bundle into a hole whereby the staple anchors the resulting bight portion of the bundle to the block with the two end portions or legs of the bundle extending outwardly from the hole to provide a bristle tuft.

The brush blocks are clamped to a holder or table which is moved after each drilling and filling operation to locate and index the block or blocks through a predetermined hole location pattern to locate the block in proper registration with one of the respective heads in a sequential plot. The positioning of the holder is controlled, for example, by eccentrics and cams as disclosed in U.S. Pat. No. 1,512,588, or by means of a master template as disclosed in U.S. Pat. No. 2,324,481.

Until recently wood has been the most economical material for the brush blocks of wire bristle brushes, etc., and accordingly the holes for anchoring the bristle bundles or tufts have to be drilled to form a predetermined hole pattern. Thus the cams or templates used to position the blocks for the filling operation must correlate to the pattern for the drilled holes. Since cams and templates wear during use and since they must be changed frequently to accommodate different sizes and types of brush blocks being used, the practice in the prior art has been to use the same cams or template at the same time to position one brush block for filling, that are used for positioning another brush block for drilling. Accordingly, a brush block after having been drilled is moved to another holder in the same apparatus where it is sequentially positioned for "filling" in the same manner and using the same cams or templates that were used to position it for drilling.

Thus even though the cams or templates wear and the hole pattern changes, the positioning for both drilling and filling will accurately correlate. This assumes that the blocks are filled shortly after the holes are drilled so that there is little or no wearing of the cams or template, or new setup of the cams or templates between the drilling and filling operations.

The cost of wooden brush blocks has, however, reached the point that plastic brush blocks are at least as economical and possibly more economical than the wooden blocks. With plastic brush blocks it is possible to mold the blocks with the holes formed by the molding process rather than by drilling them. Accordingly, the positioning of a holder would be necessary only for the purpose of the filling operation.

It follows that for a particular mold hole pattern, a very accurate and uniform positioning for the filling operation must be maintained. This cannot be satisfactorily accomplished with cams or templates however, since the positioning will vary with wear and with different cam or template setups. Also the accuracy required for cam or template setup would make the setup time excessive and burdensome.

One further aspect of the advent of the plastic brush blocks is that they can often be molded with a curved bristle receiving surface which, assuming that holes were formed with a uniform depth, would provide a brush having a curved bristle surface. This is advantageous for many uses of hand brushes, however, prior art drill and fill machines have not had sufficient accuracy for filling holes formed in this manner.

The method and apparatus of the present invention, however, satisfy the difficulties and requirements indicated above and afford other features and advantages not obtainable from the prior art.

SUMMARY OF THE INVENTION

It is among the objects of the invention to provide an improved method and apparatus for moving a brush block with bristle receiving holes formed therein, sequentially through predetermined hole spacing movements from one position to another to register each brush block hole with an operating head.

Another object is to accurately locate a brush block sequentially at a plurality of predetermined positions in a predetermined three dimensional plot corresponding to the pattern of bristle receiving holes formed in a face of a brush block.

A further object is to locate a molded plastic brush block having a plurality of bristle receiving holes molded therein, at a plurality of sequential positions corresponding to the plot of the bristle receiving holes.

Still another object is to assure accuracy and uniformity during repeated cycling of an apparatus for sequentially positioning a brush block with holes formed in a curved surface thereof in spatial registration with an operating head for anchoring bristles in the holes.

A still further object is to provide an apparatus for sequentially positioning a brush block in accordance with a pattern of holes formed therein, so that each hole is sequentially placed in spatial registration with an operating head for anchoring bristles in the holes, which apparatus is readily adaptable to numerical control.

These and other objects and advantages are accomplished by the method and apparatus of the present invention which is adapted for use in connection with conventional machines, for example, for anchoring bristle tufts in the holes formed in a surface of a brush block.

According to the method of the invention, a brush block is located in a holder with one of the holes in proper registration with an operating head that moves and functions in such a manner as to bend a bristle bundle intermediate its ends to form a bight and then to anchor the bight portion in the hole. Then a plurality of groups of driving pulses are generated, each group being representative of a direction and distance along a coordinate axis that the brush block must be moved to position another hole in tuft receiving spatial registration relative to a filling head. The pulse groups are used to drive a plurality of stepping motors, each of the stepping motors being driven by the pulses of one of said groups to move the brush block a predetermined distance along one of the coordinate axes. After the stepping motors have been driven by the groups of pulses so as to move the brush block through a hole spacing increment another bristle tuft is anchored in the hole that has been placed in proper spatial registration with the operating head. Then the operation is repeated so that the brush block holder is moved sequentially through predetermined hole spacing increments from one position to another to register each brush block hole successively with the operating head.

According to the apparatus of the invention there is provided a spatial positioning and indexing mechanism for the brush block holder which mechanism comprises a base, a first table mounted on the base for linear movement, a second table mounted on the first table for linear movement perpendicular to the movement of the first table, and a third table mounted on the second table for linear movement perpendicular to the movement of the first and second tables and adapted to carry the brush block holder. Three stepping motors, one connected to and adapted to move each of said three tables are provided. The stepping motors are driven by groups of electrical driving pulses, the respective group for each incremental operation of each stepping motor, being predetermined so that the brush block holder is moved sequentially through predetermined hole spacing increments from one position to another to register each brush block hole successively with the operating head to receive a bristle tuft.

The plot for the sequential movements of the holder through a complete cycle may be so provided that more than one brush block may be filled during the cycle. Also a plurality of operating heads may be provided for anchoring the bristles and a separate holder may be provided for each of the operating heads, the holders all being interconnected in fixed relation relative to one another so that a plurality of bristle anchoring operations can be performed using only one positioning and indexing mechanism embodying the invention.

According to the preferred embodiment of the invention, the third table is formed of two separate sections which move toward and away from one another so that the center of gravity of the third table does not change relative to its support.

According to another aspect of the invention, the means for generating the electrical driving pulses is a prepared multichannel tape with predetermined groups of signal pulses carried thereby, the signal pulses being capable of amplification to electrical driving pulses during transport of the tape so as to provide the necessary pulses for each of the respective stepping motors.

DESCRIPTION OF THE PREFERRED EMBODIMENT

Figure 1:
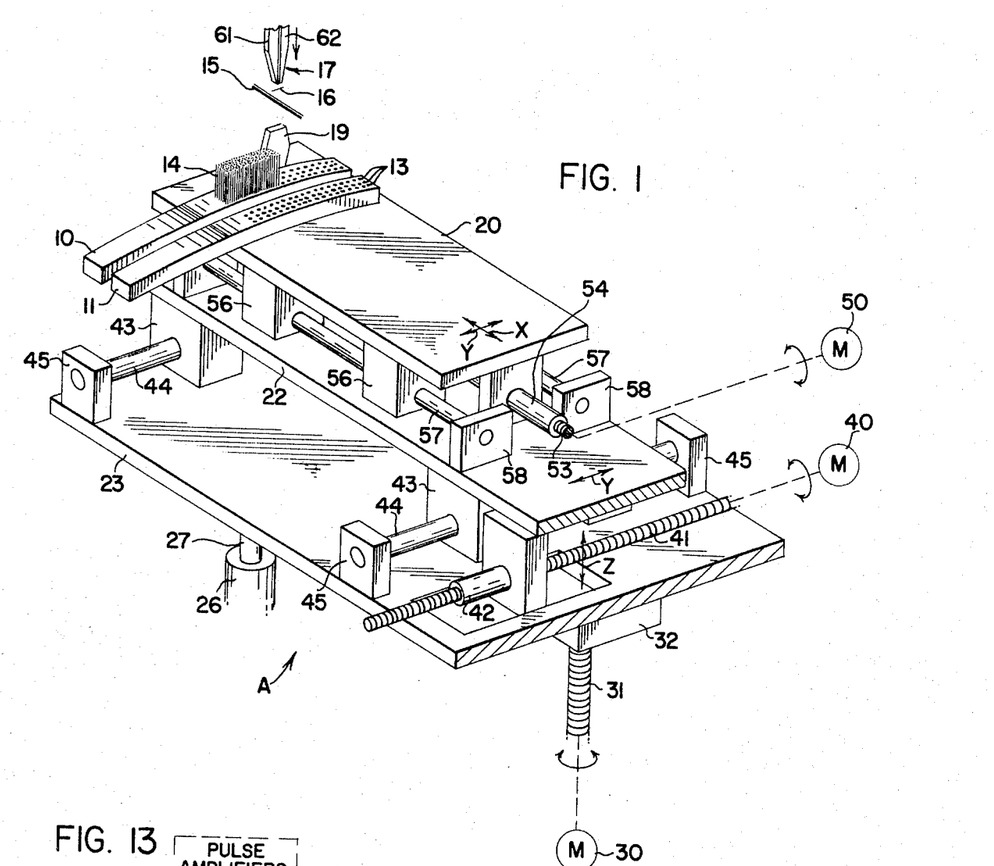
FIG. 1 is a fragmentary perspective view in somewhat diagrammatic form illustrating a portion of a brush block positioning and indexing mechanism embodying the invention.
Figure 2:
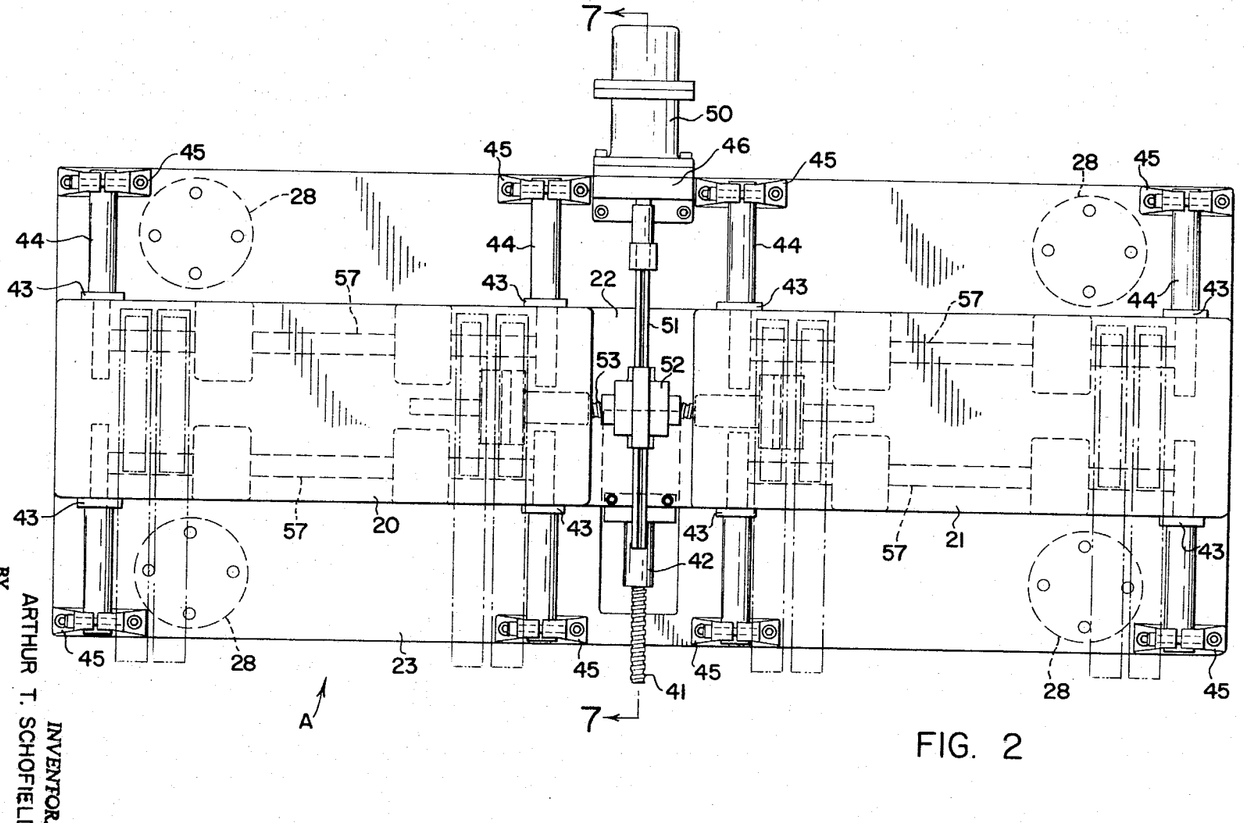
FIG. 2 is a plan view of a brush block positioning and indexing mechanism embodying the invention and adapted for use in connection with a brush block filling machine.
Figure 3:
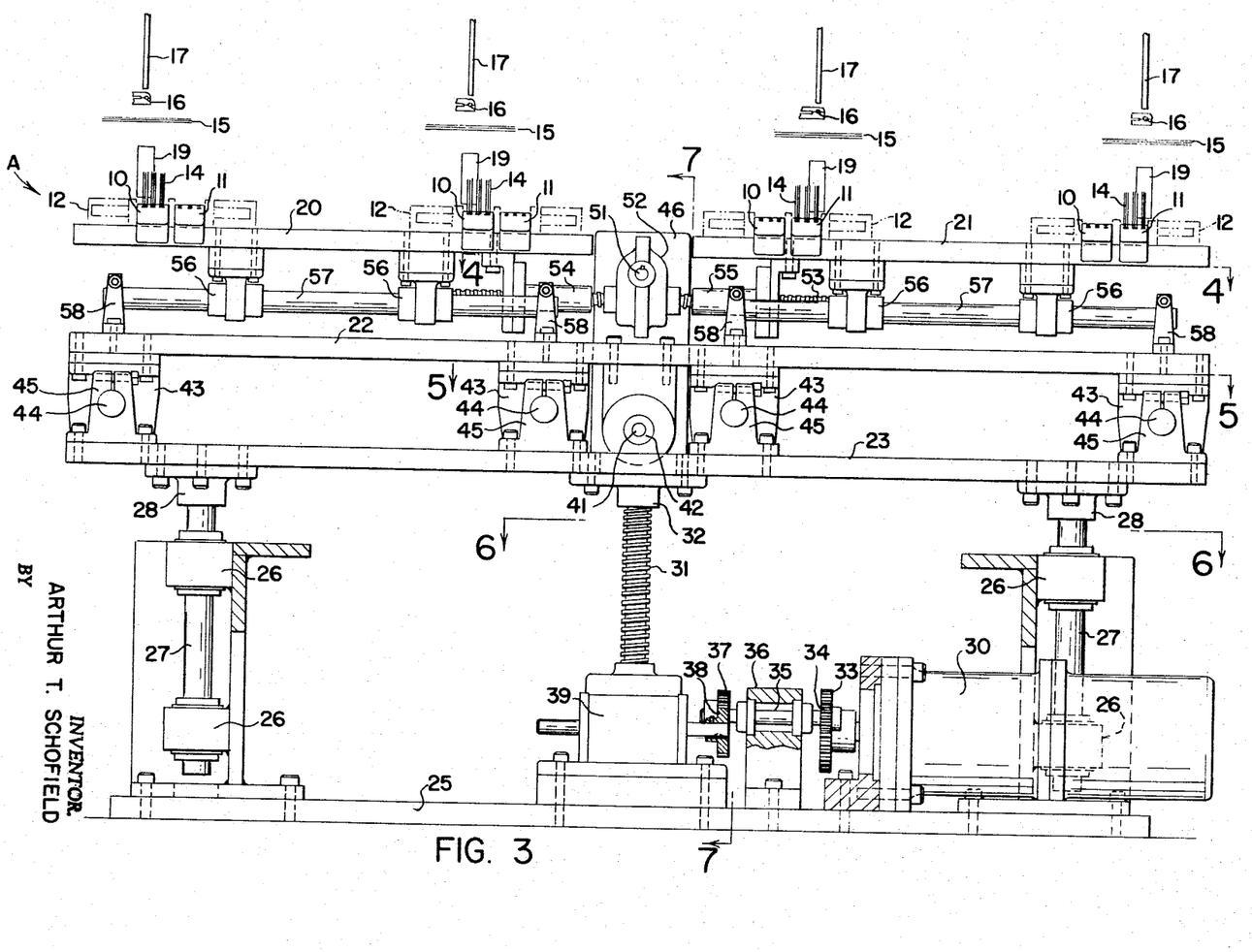
FIG. 3 is a front elevation of the mechanism of FIG. 2 with parts broken away and shown in section for the purpose of illustration.
Figure 4:
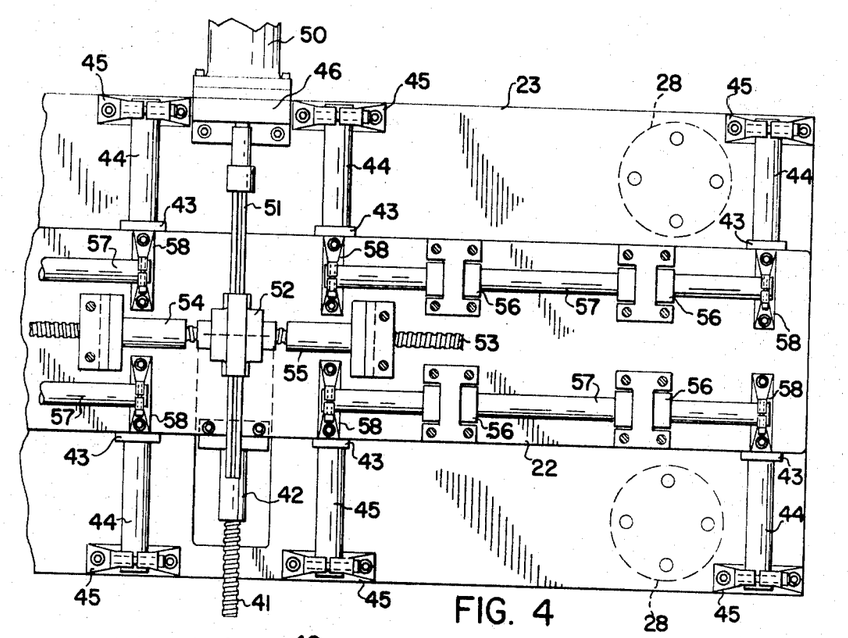
FIG. 4 is a fragmentary sectional view on an enlarged scale taken on the line 4—4 of FIG. 3.
Figure 5:
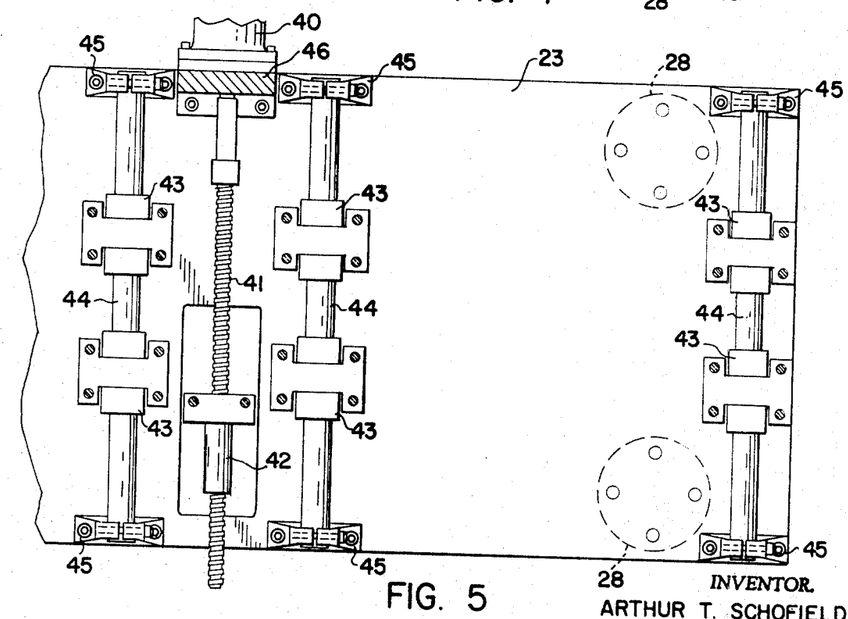
FIG. 5 is a fragmentary sectional view on an enlarged scale taken on the line 5—5 of FIG. 3.

Referring more particulary to the drawings and initially to FIGS. 1, 2, and 3 there is shown a positioning and indexing mechanism A for use in connection with a machine for anchoring bristle tufts to brush blocks, which operation is known as "filling" in the art. In the present instance the "filling" machine is adapted to perform four "filling" operations simultaneously.

The positioning and indexing mechanism A is illustrated and described herein for the purpose of describing a typical application of the invention in connection with four pairs of brush blocks 10 and 11 for use in making wire tufted hand brushes. The brush blocks 10 and 11 are gripped side by side in each of four holders 12, and are molded of plastic material with bristle receiving holes 13 formed therein in a predetermined pattern.

Referring to FIG. 1 it will be seen that each brush block 10 has a number of bristle tufts 14 already anchored thereto and is positioned preparatory to having a bristle bundle 15 anchored by a staple 16 in one of the brush block holes 13. The staple 16 is about to be picked up by one of four staple carriers 17 that carry the staple and bristle bundle 15 down to the top surface of the brush block 10 after which the staple 16 and bristle bundle 15 are driven into the respective hole by a staple driver 18 that cooperates with the staple carrier 17. A tumbler 19 guides the staple carrier 17 during the terminal part of its movement and also serves to bend or "break" the oppositely extending ends of the bristle bundle 15 to form a "bight."

Figure 6:
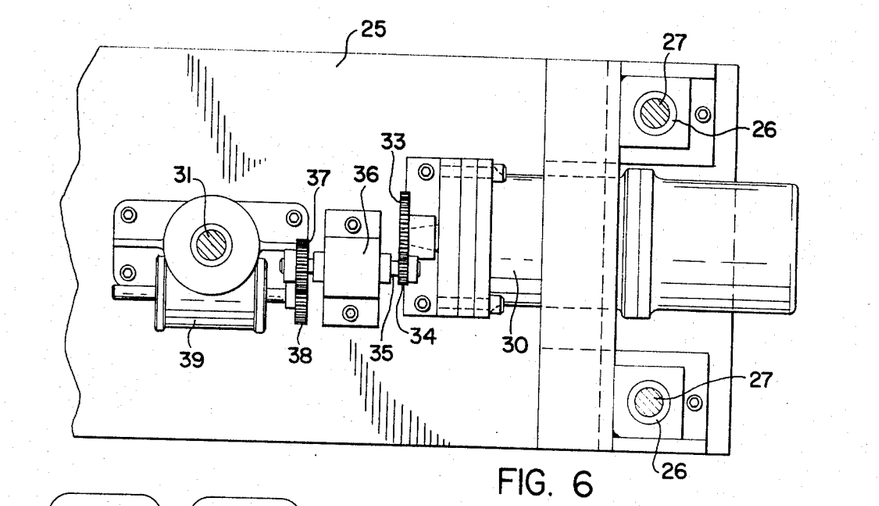
FIG. 6 is a fragmentary sectional view on an enlarged scale taken on the line 6—6 of FIG. 3.

The holders 12 are best illustrated in FIG. 3 and are adapted to accurately position and clamp two brush blocks 10 and 11 side by side preparatory to the "filling" operation. The holders 12 are mounted on one of two interconnected X-axis tables 20 and 21 that move in opposite directions and are adapted to be moved by the mechanism A relative to three mutually perpendicular coordinate axes that will be referred to herein as the X, Y and Z axes. The X axis tables 20 and 21 are movable relative to the staple carriers 17 in the direction of any of the three coordinate axes and are mounted on a Y axis table that is movable vertically or in the direction of the Z axis, as well as in the direction of the Y axis. The Y axis table 22 in turn is mounted on a Z axis table 23 which moves only vertically or in the direction of the Z axis. The mechanism A is supported on a base 25 (FIGS. 3, 6 and 7) having four pairs of guide bushings 26 mounted thereon to receive and guide therein four vertical guide rods 27 mounted in brackets 28 bolted to the bottom of the Z axis table 23.

The Z axis table is moved vertically in the direction of the Z axis by means of an electro-hydraulic stepping motor 30 which turns a drive screw 31 that drives a nut 32 bolted to the bottom of the Z axis table 23. The stepping motor 30 is bolted to the base 23 and drives the screw 31 through reduction gearing as follows:

The output gear 33 for the stepping motor 30 meshes with a pinion 34 mounted on one end of a shaft 35 journaled in a bearing block 36 bolted to the base 25. The other end of the shaft 35 has a pinion 37 keyed thereto that meshes with a gear 38 on the input shaft of a differential gear box 39. The bottom end of the screw 31 is journaled in the differential box 39 and is driven in response to the drive supplied by the gear 38.

It will be seen that the screw 31 supports substantially all the weight of the mechanism and accordingly the force required to lift the mechanism must be supplied by the electro-hydraulic stepping motor 30. Since it is desirable, in order to produce a high speed of operation, that the raising and lowering be accomplished as quickly as possible it is desirable to reduce the inertia of the mechanism A as much as possible so that it will be capable of rapid acceleration. Accordingly, the X axis tables 20 and 21, Y axis table 22 and Z 23 axis table are preferably made of an extremely light weight metal such as magnesium. This minimizes the mass of the unit and thus reduces the inertia which the electro-hydraulic stepping motor 30 must overcome.

Mounted on the Z axis table 23 is another electro-hydraulic stepping motor 40 that turns a screw 41 that in turn drives a drive nut 42 connected to the Y axis table 22 so as to propel the Y axis table in the direction of the Y axis. Movement of the Y axis table 22 is guided by means of four pairs of guide bushings 43 bolted to the bottom of the Y axis table 22, each pair of which slides along one of four guide rods 44 secured at their ends in brackets 45 fastened to the top surface of the Z axis table 23.

The X axis tables 20 and 21 are moved in opposite directions along the X axis by an electro-hydraulic stepping motor 50 bolted to a motor mounting bracket 46 that also supports the electro-hydraulic stepping motor 40 and that is bolted to the Z axis table 23. The motor 50 turns a splined shaft 51 that slidably engages with a differential drive unit 52 bolted to the Y axis table 23. The slidable engagement between the splined shaft 51 and differential drive unit 52 permits the splined shaft 51 to accommodate different positions of the Y axis table 22 along the axis of the shaft 51. The shaft 51 through the differential drive unit 52 turns a screw 53 that extends from opposite ends of the differential drive unit 52 and that has the threads on its opposite ends reversed relative to one another. The screw 53 drives in opposite directions, two drive nuts 54 and 55, one at each end thereof, the nut 54 being bolted to the table 20 and the nut 55 being bolted to the table 21.

The movement of the X axis tables 20 and 21 along the X axis is guided by four pairs of guide bushings 56 each of which slides along one of four guide rods 57 that are secured at their ends in brackets 58 bolted to the Y axis table 22. Two pairs of guide bushings 56 are bolted to the bottom of each X axis table 20 and 21.

Figure 7:
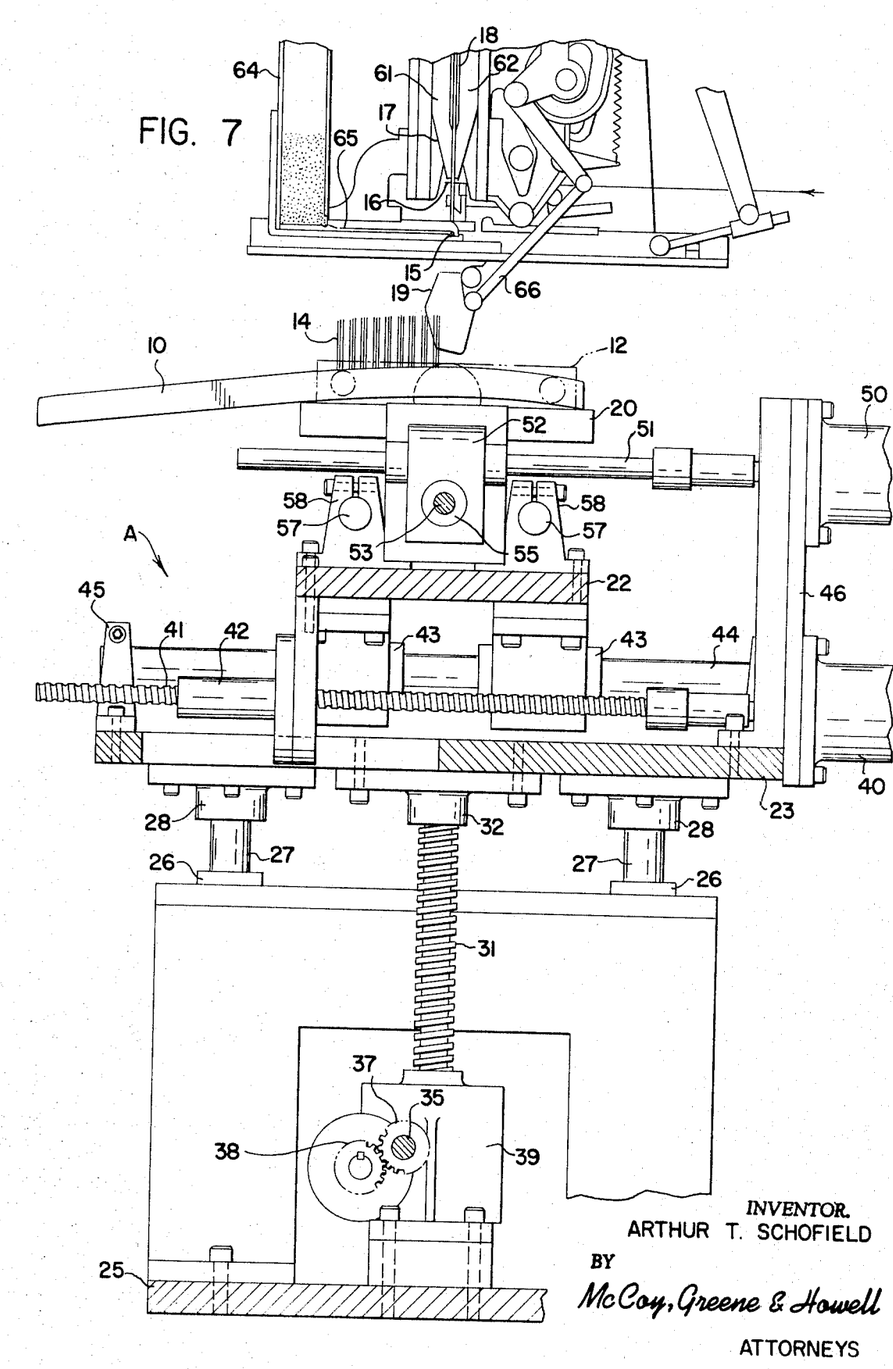
FIG. 7 is a fragmentary sectional view on an enlarged scale taken on the line 7—7 of FIG. 2.
Figure 9:
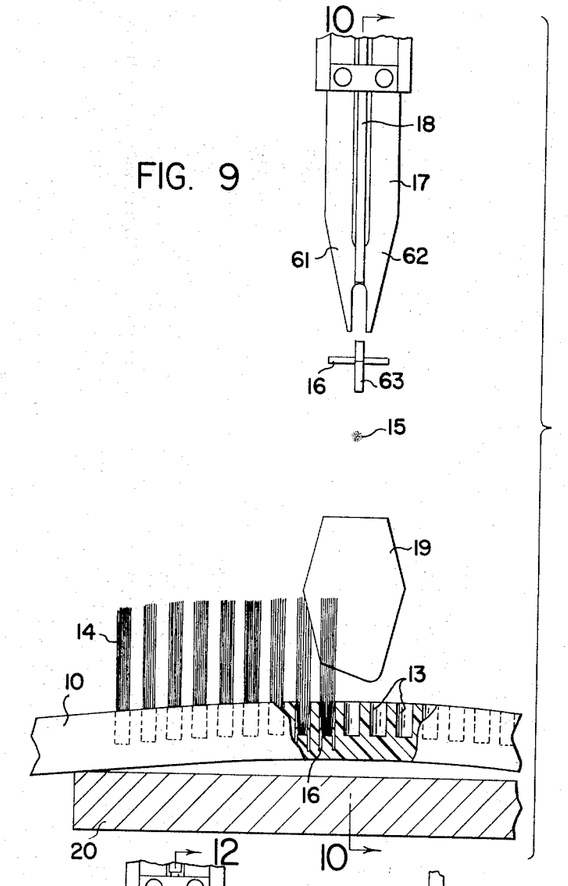
FIGS. 9 through 12 are fragmentary sectional views illustrating the "filling operation" during which bristle bundles are anchored in holes in the brush block to form the bristle tufts.
Figure 10:
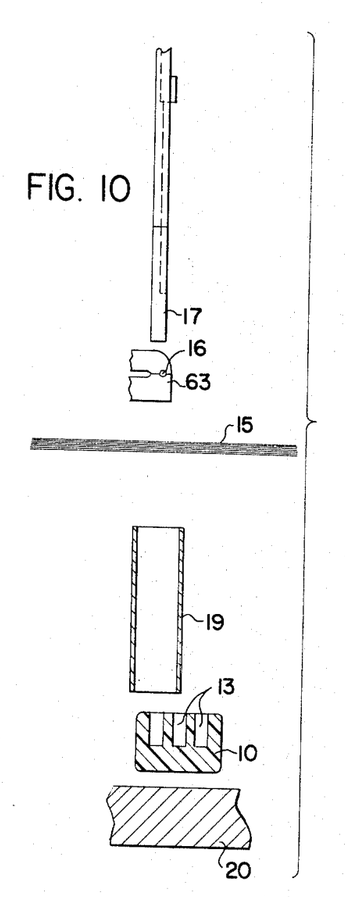
Figure 11:
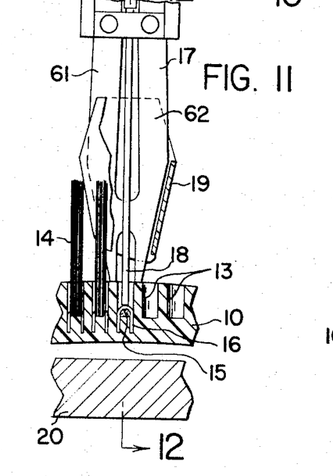
Figure 12:
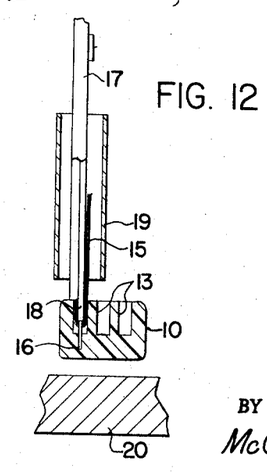

The anchoring operation is best illustrated with reference to FIGS. 7 through 12. Referring to FIG. 7 it will be seen that the staple carrier 17 comprises a pair of jaws 61 and 62 that pivot toward and away from one another in response to the action of cams or other control means associated with the "filling" machine. When the jaws 61 and 62 start their descent for a tufting operation they are pivoted apart as shown in FIG. 9. In this position they first come into engagement with a straight wire staple 16 which is positioned beneath the jaws by a staple feed head 63 (FIG. 9 and 10). The staple 16 is received in slots formed in the opposed surfaces of the jaws 61 and 62 and the continuing downward movement of the staple carrier 17 bends the ends of the staple until the staple assumes a "U" shape well up within the jaws 61 and 62. Before the staple reaches the limit of its movement into the jaws, the feed head 63 retracts to the left as viewed in FIG. 10.

The jaws 61 and 62 continue their downward movement with the staple, the staple driver moving with, but not relative to, the staple carrier 17. Then the jaws move lower and receive the bristle bundle 15 which is initially positioned at right angles to the initial position of the staple 16. The bristle bundles are supplied from a hopper 64 (FIG. 7) and are alternatingly moved into position in the path of the staple carrier 17 by a sliding tufter bar 65. As the staple carrier 17 continues downward, the tufter bar retracts and the bristle bundle 15 strikes the top of the tumbler 19 at which time the bundle "breaks," the ends being bent upward relative to the central portion engaged by the staple 16 to form a "bight."

As viewed in FIG. 7 the tumbler 19 is pivotally mounted and carried on an operating arm 66 that serves to swing the tumbler 19 out of the way of the brush bristles in between tufting operations when the brush holder 12 is moving. The tumbler 19 controls the jaws during the latter portion of their movement, forces them together to further bend in the ends of the staple 16, and guides them to the surface of the brush so that they span the hole to be "filled." At this point the staple driver 18 starts a downward movement relative to the jaws 61 and 62 to engage the top or central portion of the staple 16 and drive it with the bristle bundle 15 into the hole to anchor the tuft 15 in the respective hole. When this operation is complete the driver 18 and the staple carrier 17 are retracted and the tumbler 19 is pivoted out of the way of the bristles so that the positioning and indexing mechanism can be operated to reposition the respective brush block with another hole 13 in position for receiving a bristle bundle.

OPERATION

The tufting or anchoring of bristle tufts in the brush blocks 10 and 11 using the positioning and indexing mechanism A in conjunction with the machine in accordance with the method of the invention begins by positioning eight preformed brush blocks 10 and 11 in the mechanism A, two blocks in each of the four holders 12. The holders are then clamped. Initially the holders are positioned by the mechanism A so that one of the corner holes of the first block 10 to be tufted is aligned with the staple carrier 17. This position will vary with different types of brush blocks and with different patterns of holes. In the present instance the brush blocks each have 57 holes in a pattern comprising three columns containing 19 holes.

With the starting hole of each of the four blocks 10 thus aligned with the staple carrier the machine is actuated in the manner described above to anchor a bristle bundle 15 in the hole with a staple 16. After the staple carrier is retracted and the tumbler is pivoted to a retracted position the mechanism A is operated and, according to a typical pattern, moves the brush blocks initially an increment of one whole spacing along the X axis to locate the next hole in the filling position. It will be noted that the two X axis tables 20 and 21 move in opposite directions, the movement of the table 21 being in the direction along the X axis opposite to the direction of movement of the table 20. Accordingly for the present purposes, only the movement of the Table 20 will be described. It will be noted that the brush blocks 10 and 11 all have curved bristle receiving faces and that the holes 13 are of uniform depth so that in order to properly position different holes relative to the terminal position of the staple carrier 17 certain movement of the brush blocks along the Z axis is required. It will be seen however, that this movement is of a much smaller magnitude than the necessary movements in the X and Y directions.

After the brush blocks are moved from left to right as viewed in FIG. 3 it is then necessary to index the brush blocks through one full hole spacing along the Y axis. Since this movement is along a curved surface some movement must be required in the direction of the Z axis as well.

Figure 8:
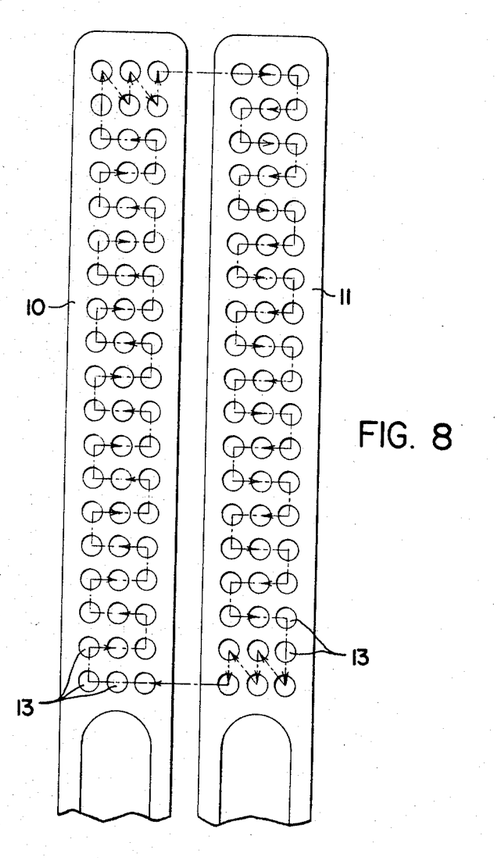
FIG. 8 is a plan view on an enlarged scale showing a pair of brush blocks and indicating the plot through which the brush blocks are moved during the positioning and indexing operation that is accomplished to complete the anchoring of bristle tufts in the brush blocks.

The intermittent indexing movement is continued so as to follow the pattern indicated in FIG. 8 as to the X and Y axis and, in addition, when a movement is required along the Y axis, i.e., at every third indexing movement the movement along the Y axis is accompanied by a small movement along the Z axis. The movements are of course accomplished using the electro-hydraulic stepping motors 30, 40 and 50 in responses to electrical driving pulses received from a control unit to be described below. For the purpose of illustration the indexing pattern is designed for two brush blocks positioned side by side so that the movement along the Y axis from the lower end to the upper end of the brush is followed by a movement from the upper end to the lower end or back to a starting position. In this way a loop type movement is provided from the starting position back to the starting position using relatively small increments of movement and thus avoiding any large time consuming increments of movement along any of the axes.

CONTROL SYSTEM

Figure 13:
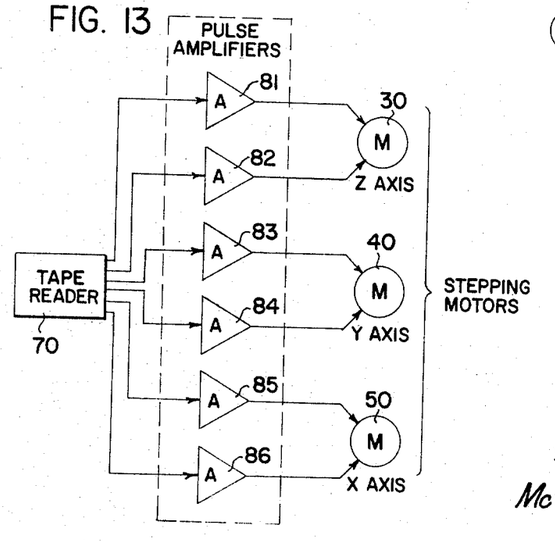
FIG. 13 is a schematic diagram of the control system for the apparatus of the invention.

FIG. 13 shows in diagrammatic form a numerical control system for the positioning and indexing mechanism A. The system controls the operation of the electro-hydraulic stepping motors 30, 40 and 50 through, for example, the pattern illustrated in FIG. 8. The system uses information storage means such as punched tape containing control information for anchoring tufts in a specific pair of brush blocks. The tape is normally advanced continuously through a tape reader 70 that may use, for example, a light beam detector to complete intermittently a signal producing circuit. In the embodiment shown six parallel "channels" of information are punched into the tape.

The resulting signals for each channel in the form of electrical pulses are fed to a motor control unit that may be, for example, the unit commercially available under the trade designation Icon 410 from Icon Corporation of 156 Sixth Street, Cambridge, Mass. The control unit 70 includes six pulse amplifiers 81, 82, 83, 84, 85 and 86 which are adapted to amplify the signal pulses from the tape reader 70 and to produce electrical driving pulses of the proper voltage and amperage for driving the respective stepping motors 30, 40 and 50.

Since all of the electro-hydraulic stepping motors must be turned in both a forward and reverse direction, it is necessary that the control pulses for operating each motor in the forward direction be provided on a separate channel from the channel providing the control pulses for reversing the motor. The respective driving pulses must be delivered to either a forward or reverse terminal of the respective electrohydraulic stepping motor. It should also be noted that the control unit normally will contain auxiliary output terminals that provide control pulses to operate other components such as to cycle the staple head, to cause the holder to move to a clamping position, and others according to the circumstances.

It will be apparent that the present invention may be employed to drill holes in wood or plastic or other brush blocks having either flat or curved faces by substituting in the machine a drilling head for the filling head described heretofore. Suitable drilling head mechanisms may be, for example, of the type shown in U.S. Pat. No. 1,512,588. Such drilling heads may be employed in a machine having a plurality of operating heads, some of which will be filling heads, so that drill and fill operations can be carried out at a different stations on the same machine. Since the positioning of the brush blocks relative to the drilling head will be carried out in the same sequential steps employed to position the brush blocks to the filling head, the control system is essentially identical for both operations.

While the method and machine of the invention have been shown and described with respect to specific embodiments thereof this is intended for the purpose of illustration rather than limitation and other variations and modifications will be apparent to those skilled in the art upon a reading of the specification. Ac-

I claim:

1. In a brush making machine including a holder for a brush block to which a plurality of bristle tufts are to be secured and an operating head adapted to insert and secure a bristle tuft in one of a plurality of holes formed in the brush block, the improvement which comprises;
a spatial positioning and indexing mechanism for said brush block holder including a base, a first table mounted on said base for vertical movement, a second table mounted on said first table for horizontal movement a third table mounted on said second table for horizontal movement perpendicular to the movement of said second table and adapted to carry said brush block holder, a first stepping motor operatively connected to said first table, a second stepping motor operatively connected to said second table, a third stepping motor operatively connected to said third table, and means for generating electrical driving pulses to drive said stepping motors whereby said brush block holder is moved sequentially through predetermined hole spacing increments from one position to another to register each brush block hole successively with the operating head to receive a bristle tuft.

2. Apparatus as defined in claim 1 wherein said third table comprises two separate parts, each of which carries at least one brush block holder, and including means operatively connected to said third stepping motor for moving said parts simultaneously in opposite directions toward and away from one another along the same line of movement at the same rate whereby the center of gravity of said third table remains fixed relative to said second table.

3. Apparatus as defined in claim 2 wherein four of said block holders are provided, two on each of said parts.

4. Apparatus as defined in claim 1 wherein said brush block holder is adapted to hold two brush blocks in side-by-side relation.

5. Apparatus as defined in claim 1 wherein said motors are electro-hydraulic stepping motors.

6. In a brush making machine including at least two holders for brush blocks to which a plurality of bristle tufts are to be secured and at least two operating heads, each adapted to insert and secure a bristle tuft in one of a plurality of holes formed in a curved face of each brush block; the improvement which comprises a spatial positioning and indexing mechanism for said brush block holder, including a base, a lower table mounted on said base for vertical movement, a middle table mounted on said first table for horizontal movement relative to said lower table, a pair of upper tables mounted on said middle table for horizontal movement relative to said middle table, each upper table being adapted to carry at least one brush block holder, said upper tables being movable in opposite directions simultaneously toward and away from one another along a line of movement perpendicular to the horizontal movement of said middle table, a first stepping motor operatively connected to said lower table, a second stepping motor operatively connected to said middle table, a third stepping motor operatively connected to each of said upper tables, and means for generating electrical driving pulses to drive said stepping motors whereby said brush block holders are moved sequentially in a three dimensional plot through predetermined hole spacing increments from one position to another to register each brush block hole successively with the respective operating head to receive a bristle tuft.

7. A method for securing a plurality of bristle tufts in a brush block having a plurality of tuft-receiving holes, comprising the steps of:
locating a brush block in a holder;
generating simultaneously, up to three groups of discrete driving pulses, each group being representative of a direction along and distance along a corresponding coordinate axis that a brush block must be moved from a position with one of said holes in tuft-receiving spatial registration relative to an operating head having a fixed location for its operating travel, to a position with another of said holes in tuft-receiving spatial registration relative to said operating head;
driving up to three stepping motors with said groups of driving pulses, each of said motors being driven by the pulses of its respective group to move said holder a predetermined composite distance equal to the sum of discrete equal distance increments along the respective coordinate axis and each pulse of said respective group being adapted to move said holder one of said discrete distance increments;
after said stepping motors have been driven by said groups, anchoring a bristle tuft in the hole of said brush that has been placed in registration with said operating head; and
thereafter repeating said three last-named steps whereby said holder is moved sequentially through predetermined hole-spacing increments from one position to another to register each brush block hole successively with said operating head.

8. A method for securing a plurality of bristle tufts in at least two brush blocks, each block having a plurality of tuft-receiving holes, comprising the steps of:
locating each brush block in one of at least two holders, said holders being movable simultaneously in the same direction along at least one coordinate axis and being movable concurrently toward and away from one another along another coordinate axis perpendicular to said one axis;
generating at least one group of discrete driving pulses representative of a direction and distance along said one coordinate axis that said brush blocks must be moved from a position with one of said holes in tuft-receiving spatial registration relative to an operating head having a fixed location for its operating travel to a position with another of said holes in tuft-receiving spatial registration, relative to said operating head;
generating simultaneously with said one group, another group of discrete driving pulses representative of a spacing along said other coordinate axis that said two brush blocks must be moved relative to one another from a position with said one hole in said registration to a position with said other hole in said registration whereby the sequential plot of said respective holes in said one block is the mirrored image of the sequential plot of said respective holes in the other block;

driving at least two stepping motors with said groups of driving pulses, each of said motors being driven by the pulses of its respective group to move each of said holders a predetermined composite distance equal to the sum of discrete equal distance increments along the respective coordinate axis and each pulse of said respective group being adapted to move said holder one of said discrete axial increments;

after said stepping motors have been driven by said groups, anchoring a bristle tuft in the respective hole of each of said brush blocks that has been placed in registration with its respective operating head; and thereafter repeating said four last-named steps whereby said holders are moved sequentially through predetermined hole-spacing increments from one position to another to register each brush block hole successively with the respective operating head.

* * * * *